United States Patent

[11] 3,585,511

[72] Inventors Eckart Schatter;
Walter O. Spichall, both of Munich, Germany

[21] Appl. No 834,317
[22] Filed June 18, 1969
[45] Patented June 15, 1971
[73] Assignee Siemens Aktiengesellschaft, Berlin, Germany
[32] Priority July 16, 1968
[33] Germany
[31] P 17 66 763.9

[54] INTEGRATED CIRCUIT ARRANGEMENT FOR DEMODULATING AN AMPLITUDE MODULATED HIGH FREQUENCY SIGNAL
6 Claims, 2 Drawing Figs.

[52] U.S. Cl. 329/101, 307/235, 307/310, 329/178, 330/23
[51] Int. Cl. H03d 1/18
[50] Field of Search 329/101, 178, 179; 307/235, 310; 330/23; 325/319, 408, 409

[56] References Cited

UNITED STATES PATENTS

| | | | |
|---|---|---|---|
| 2,866,892 | 12/1958 | Barton | 329/179 X |
| 3,249,880 | 5/1966 | Sante | 329/178 X |
| 3,275,941 | 9/1966 | Brechling | 329/101 |
| 3,409,784 | 11/1968 | Pommerening | 307/235 X |
| 3,488,599 | 1/1970 | Csicsatka | 329/178 X |

*Primary Examiner*—Alfred L. Brody
*Attorneys*—Curt M. Avery, Arthur E. Wilfond, Herbert L. Lerner and Daniel J. Tick

ABSTRACT: An adjusting circuit which adjusts the output current of a transistor for demodulating an amplitude modulated high frequency signal in an integrated circuit in the absence of high frequency signal comprises an asymmetrical conductor closely thermally coupled to the transistor and electrically coupled through a voltage reducing network to the input of the transistor.

Figure 1:
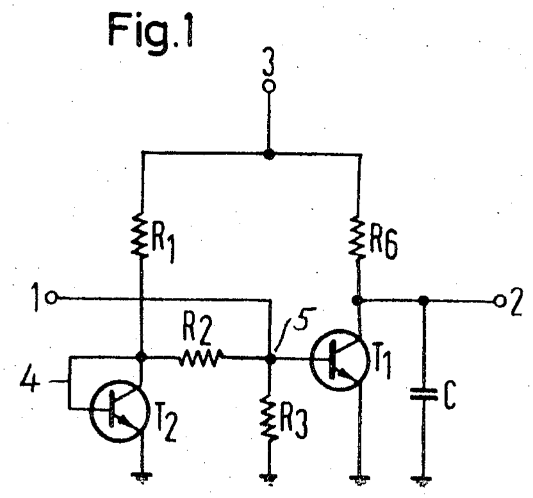

INTEGRATED CIRCUIT ARRANGEMENT FOR DEMODULATING AN AMPLITUDE MODULATED HIGH FREQUENCY SIGNAL

DESCRIPTION OF THE INVENTION

The present invention relates to a demodulating circuit. More particularly, the invention relates to an integrated circuit arrangement for demodulating an amplitude modulated high frequency signal.

The present invention relates to a circuit arrangement for demodulating an amplitude modulated high frequency signal. The demodulating operation is performed by a transistor which may be connected in grounded emitter arrangement. The transistor conducts a small output current in the absence of high frequency control relative to its output current at full high frequency control.

Demodulator circuits of the aforedescribed type are known. The demodulating operation may be achieved by operating the transistor, with regard to its working point, in the vicinity of its blocking condition. This results in rectification of the amplitude modulated high frequency signal. The small steady current which flows through the transistor in the absence of high frequency control enhances the linearity of the characteristic of the demodulator.

Circuit arrangements of the aforedescribed type have the advantage of providing demodulated signals of large magnitude, even when the modulated high frequency signals are of small magnitude. Circuit arrangements of this type, however, have poor thermal stability, since additional circuitry for insuring the aforementioned small steady current in the absence of high frequency control are expensive and complex when it includes additional devices for stabilizing the temperature.

The principal object of the present invention is to provide a new and improved circuit arrangement for demodulating an amplitude modulated high frequency signal.

An object of the present invention is to provide an integrated circuit arrangement for demodulating an amplitude modulated high frequency signal.

An object of the present invention is to provide a circuit arrangement for demodulating an amplitude modulated high frequency signal, which circuit arrangement overcomes the disadvantages of known similar circuit arrangements.

An object of the present invention is to provide a thermally stable circuit arrangement for demodulating an amplitude modulated high frequency signal.

An object of the present invention is to provide a circuit arrangement of simple structure for demodulating an amplitude modulated high frequency signal.

An object of the present invention is to provide an inexpensive circuit arrangement for demodulating an amplitude modulated high frequency signal.

An object of the present invention is to provide a circuit arrangement for demodulating an amplitude modulated high frequency signal, which circuit arrangement operates with efficiency, effectiveness and reliability.

An object of the present invention is to provide a circuit arrangement for demodulating an amplitude modulated high frequency signal, which circuit arrangement provides close thermal coupling between the asymmetrical conductor and the demodulator.

In accordance with the present invention, an integrated circuit for demodulating an amplitude modulated high frequency signal, which includes demodulating means comprising an emitter-connected transistor, the demodulating transistor having emitter, collector and base electrodes and conduct a small idling output current in the absence of a high frequency signal relative to its output current at full high frequency signal, input means connected to the base electrode of the demodulating transistor for supplying an amplitude modulated high frequency signal, and output means connected to the collector electrode of the demodulating transistor for providing the demodulated signal, comprises a source of supply voltage. An asymmetrical conductor comprising a transistor of the same conductivity type as the demodulating transistor is connected to the source of supply voltage and has a collector electrode and a base electrode connected to each other. The asymmetrical conducting transistor has a voltage drop due to the voltage supply. A resistance network connected between the collector electrode of the asymmetrical conducting transistor and the base electrode of the demodulating transistor reduces the voltage and applies the voltage drop to the demodulating transistor whereby the voltage drop provides a stabilization which renders the magnitude of the current independent from temperature fluctuations in the demodulating transistor.

The resistance network comprises an ohmic voltage divider connected in parallel with the asymmetrical conducting transistor and has a tap point connected to the base electrode of the demodulating transistor.

The demodulating means further comprises a feedback resistor connected into that branch of the demodulating transistor which is common to its base and collector electrodes. A load capacitor is connected to the collector electrode of the demodulating transistor. A feedback resistor is connected into that branch of the demodulating resistor which is common to its base and collector electrodes and forms part of the voltage divider. The tap point of the voltage divider is connected to the emitter electrode of the demodulating transistor.

The resistance network comprises three ohmic resistors $R_2$, $R_4$, $R_5$ two of which, $R_4$ and $R_5$, are connected as an ohmic voltage divider in parallel with the asymmetrical conducting transistor. The ohmic voltage divider has a tap point connected to the emitter electrode of the demodulating transistor. The third of the resistors $R_2$ is connected between the base electrode of the demodulating transistor and the collector electrode of the asymmetrical conducting transistor.

Figure 2:
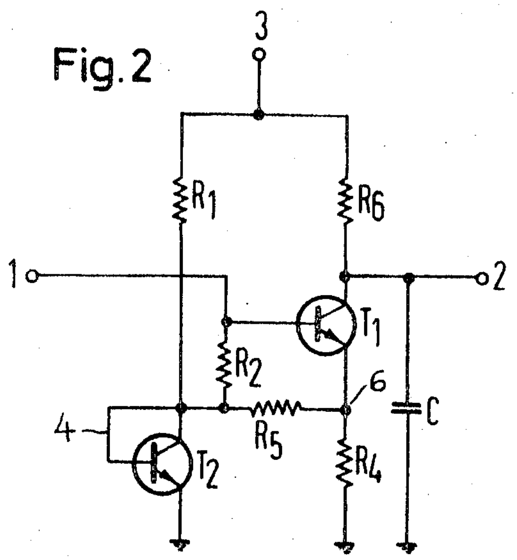

In order that the present invention may be readily carried into effect it will now be described with reference to the accompanying drawing, wherein:

FIG. 1 is a circuit diagram of an embodiment of the demodulator circuit arrangement of the present invention: and FIG. 2 is a circuit diagram of another embodiment of the demodulator circuit arrangement of the present invention.

In the FIGS., the same components are identified by the same reference numerals.

As shown in FIGS. 1 and 2, a transistor $T_1$ functions as the demodulator. A working resistor $R_6$ is connected to the collector electrode of the transistor $T_1$. A load capacitor C is connected to the collector electrode of the transistor $T_1$ and an output terminal 2 is connected to said collector electrode. The demodulated signal is provided at the output terminal 2.

An amplitude modulated high frequency signal is supplied to the base electrode of the transistor $T_1$ directly from an input terminal 1. An asymmetrical conductor is provided to adjust or determine the output current of the transistor $T_1$. In accordance with the disclosed embodiment of the present invention, the asymmetrical conductor comprises a short-circuited transistor $T_2$. The transistors $T_1$ and $T_2$ and their associated circuitry, are built into an integrated circuit, so that said transistors have similar characteristics and are closely thermally coupled.

A voltage is applied by a source 3 of energizing voltage and produces a current flow through the transistor $T_2$. The current flowing through the transistor $T_2$ has a magnitude which depends upon the magnitude of the energizing voltage and the resistance of a resistor $R_1$ connected between the voltage source 3 and the collector electrode of said transistor. The collector and base electrodes of the transistor $T_2$ are short-circuited via a lead 4.

A voltage reducing resistance network couples the transistor $T_2$ to the transistor $T_1$. The voltage reducing resistance network comprises a voltage divider $R_2$, $R_3$ connected in parallel with the transistor $T_2$. The voltage divider $R_2$, $R_3$ applies the voltage at the collector electrode of the transistor $T_2$ to the transistor $T_1$ as a base-emitter voltage. The tap point 5 of the voltage divider $R_2$, $R_3$ is connected to the base electrode of the demodulating transistor $T_1$. The voltage at the transistor $T_2$ is thus reduced by a specific magnitude and is utilized to adjust the output current of the demodulating transistor $T_1$ in the absence of high frequency control.

In FIG. 2 which illustrates another embodiment of the circuit arrangement of the present invention, the voltage reducing resistance network comprises a voltage divider $R_4$, $R_5$. The resistor $R_4$ of the voltage divider $R_4$, $R_5$ functions simultaneously as a negative feedback resistor for the demodulating transistor $T_1$. The tap point 6 of the voltage divider $R_4$, $R_5$ is connected to the emitter electrode of the demodulating transistor $T_1$, which electrode is common to the input and output electrodes of said transistor, said input and output electrodes being the base and collector electrodes, respectively. The resistor $R_2$, in the embodiment of FIG. 2, functions to adjust the base potential of the demodulating transistor $T_1$.

The base-emitter voltage of the demodulating transistor $T_1$ is thus derived from the potentials at the base electrode or emitter electrode, which potentials are adjusted by the resistors $R_2$ and $R_4$. The resistor $R_5$ thus provides an additional opportunity to adjust the base-emitter voltage. The feedback emitter resistor $R_4$ provides an additional advantage of to the embodiment of FIG. 2 by enhancing the linearity of the characteristic of the demodulator.

While the invention has been described by means of specific examples and in specific embodiments, we do not wish to be limited thereto, for obvious modifications will occur to those skilled in the art without departing from the spirit and scope of the invention.

We claim:

1. An integrated circuit for demodulating an amplitude modulated high frequency signal, including demodulating means comprising an emitter-connected transistor, the demodulating transistor having emitter, collector and base electrodes and conducting a small idling output current in the absence of a high frequency signal relative to its output current at full high frequency signal, input means connected to the base electrode of the demodulating transistor for supplying an amplitude modulated high frequency signal, and output means connected to the collector electrode of the demodulating transistor for providing the demodulated signal, said integrated circuit comprising a source of supply voltage, an asymmetrical conductor comprising a transistor of the same conductivity type as the demodulating transistor connected to the source of supply voltage and having a collector electrode and a base electrode connected to each other, the asymmetrical conducting transistor having a voltage drop due to the supply voltage, and a resistance network connected between the collector electrode of the asymmetrical conducting transistor and the base electrode of the demodulating transistor for reducing the voltage and applying the voltage drop to the demodulating transistor whereby the voltage drop provides a stabilization which renders the magnitude of the current independent from temperature fluctuations in the demodulating transistor.

2. An integrated circuit as claimed in claim 1, wherein the resistance network comprises an ohmic voltage divider connected in parallel with the asymmetrical conducting transistor and having a tap point connected to the base electrode of the demodulating transistor.

3. An integrated circuit as claimed in claim 1, wherein the demodulating means further comprises a feedback resistor connected into that branch of the demodulating transistor which is common to its base and collector electrodes.

4. An integrated circuit as claimed in claim 1, wherein the demodulating means further comprises a load capacitor connected to the collector electrode of the demodulating transistor.

5. An integrated circuit as claimed in claim 1, wherein the resistance network comprises three ohmic resistors $R_2$, $R_4$, $R_5$, two of which $R_4$, $R_5$ are connected as an ohmic voltage divider in parallel with the asymmetrical conducting transistor, the ohmic voltage divider having a tap point connected to the emitter electrode of the demodulating transistor, and the third of which $R_2$ is connected between the base electrode of the demodulating transistor and the collector electrode of the asymmetrical conducting transistor.

6. An integrated circuit as claimed in claim 2, wherein the demodulating means further comprises a feedback resistor connected into that branch of the demodulating transistor which is common to its base and collector electrodes and forming part of the voltage divider, the tap point of the voltage divider being connected to the emitter electrode of the demodulating transistor.